W. Kelly,
Animal Poke.
No. 91,639.  Patented June 22, 1869.
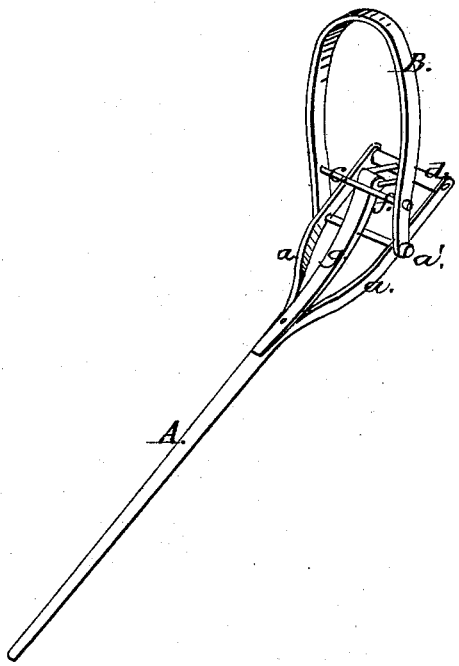
Witnesses:
Jno. A. Ellis
Jas. V. White
Inventor:
Wm Kelly
by J. H. Alexander
attorney.

United States Patent Office.

WILLIAM KELLY, OF SARANAC, MICHIGAN.

Letters Patent No. 91,639, dated June 22, 1869.

IMPROVEMENT IN ANIMAL-POKE.

The Schedule referred to in these Letters Patent and making part of the same.

*To all whom it may concern:*

Be it known that I, WILLIAM KELLY, of Saranac, in the county of Ionia, and State of Michigan, have invented certain new and useful Improvements in Animal-Poke; and I do hereby declare that the following is a full, clear, and exact description thereof, reference being had to the accompanying drawings, and to the letters of reference marked thereon, which form a part of this specification, in which is represented a perspective view of my animal-poke.

The nature of my invention consists in the employment of a device whereby animals are prevented from jumping over or breaking down fences; and to this end, It consists of a yoke, pivoted to the prongs of a bar, the ends of the prongs being united by a cylindrical bar formed with apertures, into which is inserted a staple-shaped device connected with a spring attached to the flanged bar, the object of which will hereinafter be fully set forth.

To enable others skilled in the art to which my invention appertains, to make and use the same, I will now describe its construction and operation.

In the accompanying drawing—

A represents a bar, which is made at one end with two prongs $a\ a$, as seen in the drawing.

B represents a yoke pivoted to the prongs $a\ a$ by the bolt $a'$.

$c$ is a rod passing through the yoke near where it is pivoted to the prongs.

$d$ represents a cylindrical bar formed with two apertures, and pivoted between the ends of the prongs.

$f$ represents a staple-shaped device, with its ends made sharp, entering the apertures formed in the cylindrical bar $d$.

This device is pivoted to one end of the spring $g$, while the other end of the spring is secured to the bar A, as seen at $e$.

The operation of my device is as follows:

The yoke is placed on the animal's neck, with the bar A extending out, as seen in the drawing, so that when the bar comes in contact with the fence, it forces the spring $g$ against the rod $c$, which shoves the staple-shaped device $f$ into the animal's neck and causes him to retreat.

Having thus described my invention,

What I claim as new, and desire to secure by Letters Patent, is—

1. The bar, constructed with prongs $a\ a$, and provided with the movable bar $d$, substantially as and for the purpose set forth.

2. The movable staple $f$, arranged to operate substantially for the purpose specified.

3. The staple $f$, attached to the spring $g$, in combination with yoke B, movable bar $d$, and bar A, substantially as set forth.

In testimony that I claim the foregoing as my own, I affix my signature, in presence of two witnesses.

WM. KELLY.

Witnesses:
 RICHARD VOSPER,
 G. A. COTTON.